(12) United States Patent
Amundson

(10) Patent No.: US 10,824,042 B1
(45) Date of Patent: Nov. 3, 2020

(54) ELECTRO-OPTIC DISPLAY AND COMPOSITE MATERIALS HAVING LOW THERMAL SENSITIVITY FOR USE THEREIN

(71) Applicant: E INK CORPORATION, Billerica, MA (US)

(72) Inventor: Karl Raymond Amundson, Cambridge, MA (US)

(73) Assignee: E Ink Corporation, Billerica, MA (US)

(*) Notice: Subject to any disclaimer, the term of this patent is extended or adjusted under 35 U.S.C. 154(b) by 226 days.

(21) Appl. No.: 16/169,229

(22) Filed: Oct. 24, 2018

Related U.S. Application Data (60) Provisional application No. 62/577,874, filed on Oct. 27, 2017.

(51) Int. Cl.
*G02F 1/167* (2019.01)
*G02F 1/1345* (2006.01)
(Continued)

(52) U.S. Cl.
CPC .......... *G02F 1/167* (2013.01); *C09D 5/4465* (2013.01); *C09J 7/38* (2018.01); *C09J 9/02* (2013.01); *C09J 175/04* (2013.01); *G02F 1/1368* (2013.01); *G02F 1/13452* (2013.01); *G09G 3/344* (2013.01)

(58) Field of Classification Search
CPC .... G02F 1/167; G02F 1/1368; G02F 1/13452; G02F 1/1675; G02F 1/16753; G02F 1/16755; G02F 1/16756; G02F 1/16757; G02F 1/1677; G02F 1/1679;
(Continued)

(56) References Cited

U.S. PATENT DOCUMENTS 4,418,346 A 11/1983 Batchelder
4,613,351 A 9/1986 Spohr
(Continued)

FOREIGN PATENT DOCUMENTS

WO 1999067678 A2 12/1999
WO 2000005704 A1 2/2000
WO 2000038000 A1 6/2000

OTHER PUBLICATIONS

Rohlfing, Lori Louise, "Carbon Black—Polyethylene Composites for PTC Termistor Applications—A Thesis in Solid State Science", The Pennsylvania State University, Accl. No. AD-A215 988, Dec. 1987. Dec. 1, 1987.
(Continued)

*Primary Examiner* — Tuyen Tra
(74) *Attorney, Agent, or Firm* — William John Keyes (57) ABSTRACT

An electro-optic display includes a layer of electro-optic material, at least one conductor, and an adhesive material between the layer of electro-optic material and the at least one conductor. At least one of the electro-optic material and adhesive material comprises a composite material that includes a polymer phase and a filler phase, the filler phase having a conductivity greater than or equal to $0.5 \times 10^3$ S/m, a ratio of the coefficient of thermal expansion of the filler to the polymer is less than or equal to 0.5, and a concentration of the filler phase in the composite material is greater than or equal to a filler concentration corresponding to a conductivity transition point of the composite material.

18 Claims, 6 Drawing Sheets

(51) Int. Cl.
*G02F 1/1368* (2006.01)
*C09J 9/02* (2006.01)
*C09D 5/44* (2006.01)
*C09J 175/04* (2006.01)
*C09J 7/38* (2018.01)
*G09G 3/34* (2006.01)

(58) Field of Classification Search
CPC .... G02F 1/1685; G09G 3/344; C09D 5/4465; C09J 175/04; C09J 9/02; C09J 7/38
USPC .............. 359/237, 328, 240, 245, 246, 254
See application file for complete search history.

(56) References Cited

U.S. PATENT DOCUMENTS

| | | | |
|---|---|---|---|
| 4,729,809 A | 3/1988 | Dery et al. |
| 5,213,715 A | 5/1993 | Patterson et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,252,564 B1 | 6/2001 | Albert et al. |
| 6,271,823 B1 | 8/2001 | Gordon, II et al. |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,365,949 B1 | 4/2002 | Zetfolie |
| 6,376,828 B1 | 4/2002 | Comiskey |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,480,182 B2 | 11/2002 | Turner et al. |
| 6,498,114 B1 | 12/2002 | Amundson et al. |
| 6,506,438 B2 | 1/2003 | Duthaler et al. |
| 6,518,949 B2 | 2/2003 | Drzaic |
| 6,521,489 B2 | 2/2003 | Duthaler et al. |
| 6,535,197 B1 | 3/2003 | Comiskey et al. |
| 6,545,291 B1 | 4/2003 | Amundson et al. |
| 6,639,578 B1 | 10/2003 | Comiskey et al. |
| 6,657,772 B2 | 12/2003 | Loxley |
| 6,664,944 B1 | 12/2003 | Albert et al. |
| D485,294 S | 1/2004 | Albert |
| 6,680,725 B1 | 1/2004 | Jacobson |
| 6,683,333 B2 | 1/2004 | Kazlas et al. |
| 6,724,519 B1 | 4/2004 | Morrison et al. |
| 6,750,473 B2 | 6/2004 | Amundson et al. |
| 6,816,147 B2 | 11/2004 | Albert |
| 6,819,471 B2 | 11/2004 | Amundson et al. |
| 6,825,068 B2 | 11/2004 | Denis et al. |
| 6,831,769 B2 | 12/2004 | Holman et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,873,452 B2 | 3/2005 | Tseng et al. |
| 6,909,532 B2 | 6/2005 | Chung et al. |
| 6,922,276 B2 | 7/2005 | Zhang et al. |
| 6,950,220 B2 | 9/2005 | Abramson et al. |
| 6,967,640 B2 | 11/2005 | Albert et al. |
| 6,980,196 B1 | 12/2005 | Turner et al. |
| 6,982,178 B1 | 1/2006 | LeCain et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,030,412 B1 | 4/2006 | Drzaic et al. |
| 7,072,095 B2 | 7/2006 | Liang et al. |
| 7,075,502 B1 | 7/2006 | Drzaic et al. |
| 7,075,703 B2 | 7/2006 | O'Neil et al. |
| 7,106,296 B1 | 9/2006 | Jacobson |
| 7,110,163 B2 | 9/2006 | Webber et al. |
| 7,116,318 B2 | 10/2006 | Amundson et al. |
| 7,144,942 B2 | 12/2006 | Zang et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,190,008 B2 | 3/2007 | Amundson et al. |
| 7,206,119 B2 | 4/2007 | Honeyman et al. |
| 7,223,672 B2 | 5/2007 | Kazlas et al. |
| 7,230,751 B2 | 6/2007 | Whitesides et al. |
| 7,236,291 B2 | 6/2007 | Kaga et al. |
| 7,256,766 B2 | 8/2007 | Albert et al. |
| 7,259,744 B2 | 8/2007 | Arango et al. |
| 7,280,094 B2 | 10/2007 | Albert |
| 7,301,693 B2 | 11/2007 | Chaug et al. |
| 7,304,780 B2 | 12/2007 | Liu et al. |
| 7,312,784 B2 | 12/2007 | Baucom et al. |
| 7,321,459 B2 | 1/2008 | Masuda et al. |
| 7,327,346 B2 | 2/2008 | Chung et al. |
| 7,327,511 B2 | 2/2008 | Whitesides et al. |
| 7,339,715 B2 | 3/2008 | Webber et al. |
| 7,347,957 B2 | 3/2008 | Wu et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,382,363 B2 | 6/2008 | Albert et al. |
| 7,388,572 B2 | 6/2008 | Duthaler et al. |
| 7,401,758 B2 | 7/2008 | Liang et al. |
| 7,411,719 B2 | 8/2008 | Paolini, Jr. |
| 7,420,549 B2 | 9/2008 | Jacobson et al. |
| 7,442,587 B2 | 10/2008 | Amundson et al. |
| 7,453,445 B2 | 11/2008 | Amundson |
| 7,492,497 B2 | 2/2009 | Paolini, Jr. et al. |
| 7,535,624 B2 | 5/2009 | Amundson et al. |
| 7,551,346 B2 | 6/2009 | Fazel et al. |
| 7,554,712 B2 | 6/2009 | Patry et al. |
| 7,560,004 B2 | 7/2009 | Pereira et al. |
| 7,561,324 B2 | 7/2009 | Duthaler et al. |
| 7,583,427 B2 | 9/2009 | Danner et al. |
| 7,598,173 B2 | 10/2009 | Ritenour et al. |
| 7,605,799 B2 | 10/2009 | Amundson et al. |
| 7,636,191 B2 | 12/2009 | Duthaler |
| 7,649,674 B2 | 1/2010 | Danner et al. |
| 7,667,886 B2 | 2/2010 | Danner et al. |
| 7,672,040 B2 | 3/2010 | Sohn et al. |
| 7,679,814 B2 | 3/2010 | Paolini, Jr. et al. |
| 7,688,497 B2 | 3/2010 | Danner et al. |
| 7,715,088 B2 | 5/2010 | Liang et al. |
| 7,733,335 B2 | 6/2010 | Zehner et al. |
| 7,785,988 B2 | 8/2010 | Amundson et al. |
| 7,830,592 B1 | 11/2010 | Sprague et al. |
| 7,839,564 B2 | 11/2010 | Whitesides et al. |
| 7,843,626 B2 | 11/2010 | Amundson et al. |
| 7,859,637 B2 | 12/2010 | Amundson et al. |
| 7,880,958 B2 | 2/2011 | Zang et al. |
| 7,893,435 B2 | 2/2011 | Kazlas et al. |
| 7,898,717 B2 | 3/2011 | Patry et al. |
| 7,905,977 B2 | 3/2011 | Qi et al. |
| 7,957,053 B2 | 6/2011 | Honeyman et al. |
| 7,986,450 B2 | 7/2011 | Cao et al. |
| 8,009,344 B2 | 8/2011 | Danner et al. |

(56) References Cited

U.S. PATENT DOCUMENTS

| | | |
|---|---|---|
| 8,009,348 B2 | 8/2011 | Zehner et al. |
| 8,027,081 B2 | 9/2011 | Danner et al. |
| 8,049,947 B2 | 11/2011 | Danner et al. |
| 8,072,675 B2 | 12/2011 | Lin et al. |
| 8,077,141 B2 | 12/2011 | Duthaler et al. |
| 8,089,453 B2 | 1/2012 | Comiskey et al. |
| 8,120,836 B2 | 2/2012 | Lin et al. |
| 8,159,636 B2 | 4/2012 | Sun et al. |
| 8,208,193 B2 | 6/2012 | Patry et al. |
| 8,237,892 B1 | 8/2012 | Sprague et al. |
| 8,238,021 B2 | 8/2012 | Sprague et al. |
| 8,362,488 B2 | 1/2013 | Chaug et al. |
| 8,373,211 B2 | 2/2013 | Amundson et al. |
| 8,389,381 B2 | 3/2013 | Amundson et al. |
| 8,395,836 B2 | 3/2013 | Lin |
| 8,437,069 B2 | 5/2013 | Lin |
| 8,441,414 B2 | 5/2013 | Lin |
| 8,456,589 B1 | 6/2013 | Sprague et al. |
| 8,498,042 B2 | 7/2013 | Danner et al. |
| 8,514,168 B2 | 8/2013 | Chung et al. |
| 8,547,628 B2 | 10/2013 | Wu et al. |
| 8,576,162 B2 | 11/2013 | Kang et al. |
| 8,610,988 B2 | 12/2013 | Zehner et al. |
| 8,714,780 B2 | 5/2014 | Ho et al. |
| 8,728,266 B2 | 5/2014 | Danner et al. |
| 8,743,077 B1 | 6/2014 | Sprague |
| 8,754,859 B2 | 6/2014 | Gates et al. |
| 8,797,258 B2 | 8/2014 | Sprague |
| 8,797,633 B1 | 8/2014 | Sprague et al. |
| 8,797,636 B2 | 8/2014 | Yang et al. |
| 8,830,560 B2 | 9/2014 | Danner et al. |
| 8,891,155 B2 | 11/2014 | Danner et al. |
| 8,969,886 B2 | 3/2015 | Amundson |
| 9,025,234 B2 | 5/2015 | Lin |
| 9,025,238 B2 | 5/2015 | Chan et al. |
| 9,030,374 B2 | 5/2015 | Sprague et al. |
| 9,140,952 B2 | 9/2015 | Sprague et al. |
| 9,147,364 B2 | 9/2015 | Wu et al. |
| 9,152,003 B2 | 10/2015 | Danner et al. |
| 9,152,004 B2 | 10/2015 | Paolini, Jr. et al. |
| 9,201,279 B2 | 12/2015 | Wu et al. |
| 9,223,164 B2 | 12/2015 | Lai et al. |
| 9,279,906 B2 | 3/2016 | Kang |
| 9,285,648 B2 | 3/2016 | Liu et al. |
| 9,310,661 B2 | 4/2016 | Wu et al. |
| 9,419,024 B2 | 8/2016 | Ritenour et al. |
| 9,454,057 B2 | 9/2016 | Wu et al. |
| 9,529,240 B2 | 12/2016 | Paolini, Jr. et al. |
| 9,582,041 B2 | 2/2017 | Cheng et al. |
| 9,620,066 B2 | 4/2017 | Bishop |
| 9,632,373 B2 | 4/2017 | Huang et al. |
| 9,666,142 B2 | 5/2017 | Hung |
| 9,671,635 B2 | 6/2017 | Paolini, Jr. |
| 9,778,500 B2 | 10/2017 | Gates et al. |
| 9,841,653 B2 | 12/2017 | Wu et al. |
| 2002/0060321 A1 | 5/2002 | Kazlas et al. |
| 2004/0085619 A1 | 5/2004 | Wu et al. |
| 2004/0105036 A1 | 6/2004 | Danner et al. |
| 2005/0122306 A1 | 6/2005 | Wilcox et al. |
| 2005/0122563 A1 | 6/2005 | Honeyman et al. |
| 2006/0255322 A1 | 11/2006 | Wu et al. |
| 2007/0052757 A1 | 3/2007 | Jacobson |
| 2009/0122389 A1 | 5/2009 | Whitesides et al. |
| 2009/0315044 A1 | 12/2009 | Amundson et al. |
| 2010/0177396 A1 | 7/2010 | Lin |
| 2011/0140744 A1 | 6/2011 | Kazlas et al. |
| 2011/0187683 A1 | 8/2011 | Wilcox et al. |
| 2011/0292319 A1 | 12/2011 | Cole |
| 2013/0278900 A1 | 10/2013 | Hertel et al. |
| 2014/0078024 A1 | 3/2014 | Paolini, Jr. et al. |
| 2014/0139501 A1 | 5/2014 | Amundson |
| 2014/0192000 A1 | 7/2014 | Hung et al. |
| 2014/0210701 A1 | 7/2014 | Wu et al. |
| 2015/0005720 A1 | 1/2015 | Zang |
| 2015/0226986 A1 | 8/2015 | Paolini, Jr. et al. |
| 2015/0227018 A1 | 8/2015 | Paolini, Jr. et al. |
| 2015/0261057 A1 | 9/2015 | Harris et al. |
| 2015/0277160 A1 | 10/2015 | Laxton |
| 2015/0378235 A1 | 12/2015 | Lin et al. |
| 2016/0012710 A1 | 1/2016 | Lu et al. |
| 2016/0077375 A1 | 3/2016 | Lin |
| 2016/0103380 A1 | 4/2016 | Kayal et al. |
| 2020/0032117 A1* | 1/2020 | Czaplicki ............ C08L 77/10 |
| 2020/0148803 A1* | 5/2020 | Frukhtbeyn ......... C08F 220/36 |

OTHER PUBLICATIONS

Wood, D., "An Electrochromic Renaissance?" Information Display, 18(3), 24 (Mar. 2002) Mar. 1, 2002.

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

Bach, U. et al., "Nanomaterials-Based Electrochromics for Paper-Quality Displays", Adv. Mater, vol. 14, No. 11, pp. 845-848 (Jun. 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). Jan. 1, 2001.

Yamaguchi, Y. et al., "Toner display using insulative particles charged triboelectrically", Asia Display/IDW '01, pp. 1729-1730, Paper AMD4-4 (2001). Jan. 1, 2001.

Hoang, Geun C. et al., "Electrical Resistivity and Thermal Expansion Coefficient of Carbon-Black-Filled Compounds Atouns Tg", Journal of the Korean Physical Society, vol. 44, No. 4, pp. 962-966 (Apr. 2004). Apr. 1, 2004.

* cited by examiner

ELECTRO-OPTIC DISPLAY AND COMPOSITE MATERIALS HAVING LOW THERMAL SENSITIVITY FOR USE THEREIN

CROSS-REFERENCE TO RELATED APPLICATION

The present application claims priority to and the benefit of U.S. Provisional Application 62/577,874, filed on Oct. 27, 2017, the content of which is incorporated by reference herein in its entirety.

BACKGROUND OF INVENTION

This invention relates to electro-optic displays and to materials, especially composite materials, for use therein. This invention relates in part to composite materials that are included in either adhesive or binder compositions with electrical and other properties which render them especially suitable for use in electro-optic displays.

Electro-optic displays comprise a layer of electro-optic material. The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or in the case of displays intended for machine reading, pseudo-color in the sense of a change in reflectance of electromagnetic wavelengths outside the visible range.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC. and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,873,452; 6,909,532; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,301,693; 7,304,780; 7,327,511; 7,347,957; 7,349,148; 7,352,353; 7,365,394; 7,365,733; 7,382,363; 7,388,572; 7,401,758; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,830,592; 7,843,626; 7,859,637; 7,880,958; 7,893,435; 7,898,717; 7,905,977; 7,957,053; 7,986,450; 8,009,344; 8,027,081; 8,049,947; 8,072,675; 8,077,141; 8,089,453; 8,120,836; 8,159,636; 8,208,193; 8,237,892; 8,238,021; 8,362,488; 8,373,211; 8,389,381; 8,395,836; 8,437,069; 8,441,414; 8,456,589; 8,498,042; 8,514,168; 8,547,628; 8,576,162; 8,610,988; 8,714,780; 8,728,266; 8,743,077; 8,754,859; 8,797,258; 8,797,633; 8,797,636; 8,830,560; 8,891,155; 8,969,886; 9,147,364; 9,025,234; 9,025,238; 9,030,374; 9,140,952; 9,152,003; 9,152,004; 9,201,279; 9,223,164; 9,285,648; and 9,310,661; and U.S. Patent Applications Publication Nos. 2002/0060321; 2004/0008179; 2004/0085619; 2004/0105036; 2004/0112525; 2005/0122306; 2005/0122563; 2006/0215106; 2006/0255322; 2007/0052757; 2007/0097489; 2007/0109219; 2008/0061300; 2008/0149271; 2009/0122389; 2009/0315044; 2010/0177396; 2011/0140744; 2011/0187683; 2011/0187689; 2011/0292319; 2013/0250397; 2013/0278900; 2014/0078024; 2014/0139501; 2014/0192000; 2014/0210701; 2014/0300837; 2014/0368753; 2014/0376164; 2015/0171112; 2015/0205178; 2015/0226986; 2015/0227018; 2015/0228666; 2015/0261057; 2015/0356927; 2015/0378235; 2016/077375; 2016/0103380; and 2016/0187759; and International Application Publication No. WO 00/38000; European Patents Nos. 1,099,207 B1 and 1,145,072 B1;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electrophoretic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive.

Electro-optic displays manufactured using the aforementioned front plane laminates or double release films normally have a layer of lamination adhesive between the electro-optic layer itself and the backplane, and the presence of this lamination adhesive layer affects the electro-optic characteristics of the displays. In particular, the electrical conductivity of the lamination adhesive layer affects both the low temperature performance and the resolution of the display. The low temperature performance of the display can (it has been found empirically) be improved by increasing the conductivity of the lamination adhesive layer, for example by doping the layer with tetrabutylammonium hexafluorophosphate or other materials as described in the aforementioned U.S. Pat. Nos. 7,012,735 and 7,173,752. However, increasing the conductivity of the lamination adhesive layer in this manner tends to increase pixel blooming (a phenomenon whereby the area of the electro-optic layer which changes optical state in response to change of voltage at a pixel electrode is larger than the pixel electrode itself), and this blooming tends to reduce the resolution of the display. Hence, this type of display apparently intrinsically requires a compromise between low temperature performance and display resolution, and in practice it is usually the low temperature performance which is sacrificed. Moreover, because conductivity of the lamination adhesive is temperature dependent, the temperature range at which a display is able to acceptably function may be limited to a narrow range of temperatures. This limits the potential applications of the display to environments that do not experience a wide temperature swing.

Thus, there is a need for improved lamination adhesive compositions and other composite materials that provide electrophoretic displays with improved performance across a wider range of ambient temperatures.

SUMMARY OF INVENTION

According to a first embodiment of the present invention, an electro-optic display is provided comprising a layer of electro-optic material, at least one conductor, and an adhesive material between the layer of electro-optic material and the at least one conductor. At least one of the electro-optic material and adhesive material comprises a composite material containing a polymer phase and a filler phase, such that a volume fraction of the filler phase is about the percolation threshold. Furthermore, the filler phase may have a conductivity greater than or equal to $0.5 \times 10^3$ S/m, a ratio of the coefficient of thermal expansion of the filler to the polymer may be less than or equal to 0.5, and a concentration of the filler phase in the composite material may be greater than or equal to a filler concentration corresponding to a conductivity transition point of the composite material.

The composite materials according to the various embodiments of the present invention are well suited for particle-based electrophoretic displays. However, the composite materials may also be used in other types of electro-optic displays, such as displays utilizing polymer-dispersed liquid crystal.

These and other aspects of the present invention will be apparent in view of the following description.

BRIEF DESCRIPTION OF DRAWINGS

The drawing Figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

In a typical process for manufacturing an electro-optic display, two subassemblies are first manufactured, one subassembly comprising an electro-optic layer and a first substrate, and the second comprising a second substrate; at least one of the subassemblies, and typically both, comprise an electrode. Also, in one common form of such a process, used for manufacturing an active matrix display, one subassembly comprises a substrate, a single continuous ("common") electrode which extends across multiple pixels, typically the whole of the display and the electro-optic layer, while the second assembly (usually referred to as the "backplane") comprises a substrate carrying a matrix of pixel electrodes, which define the individual pixels of the display, and non-linear devices (typically thin film transistors) and other circuitry used to produce on the pixel electrodes the potentials needed to drive the display (i.e., to switch the various pixels to the optical states necessary to provide a desired image on the display). The lamination adhesive is provided between the first and second subassemblies and adheres them together to form the final display.

A preferred lamination process of the present invention will now be described, though by way of illustration only, with reference to FIG. 1 of the accompanying drawings, which is a schematic section through one subassembly (a front plane laminate, or FPL) used in a process of the present invention, this subassembly comprising a substrate, a conductive layer, an electro-optic layer and an adhesive layer, the subassembly being illustrated at an intermediate stage of the process before this subassembly is laminated to a second subassembly.

Figure 1:
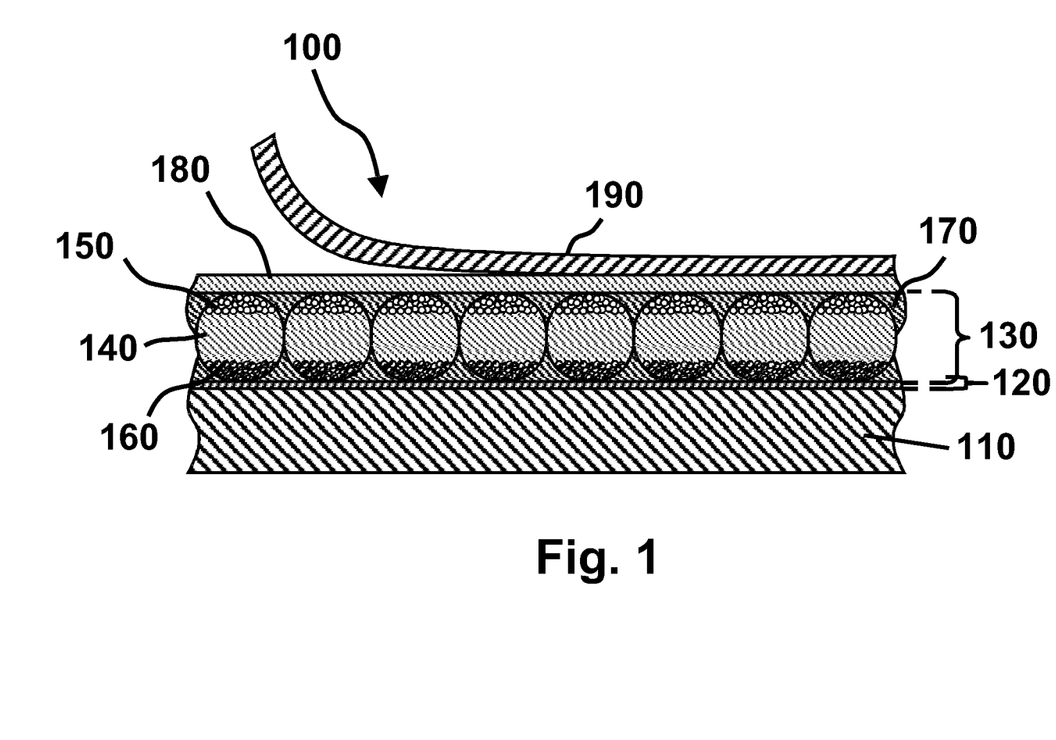
FIG. 1 is a schematic cross-section through a front plane laminate of the present invention.

The front plane laminate (generally designated 100) shown in FIG. 1 comprises a light-transmissive substrate 110, a light-transmissive electrode layer 120 (note that this is not the electrode lying on the opposed side of the lamination adhesive from the electro-optic layer in the final electro-optic display), an electro-optic layer 130, a lamination adhesive layer 180 and a release sheet 190; the release sheet is illustrated in the process of being removed from the lamination adhesive layer 180 preparatory to lamination of the FPL 100 to a backplane.

The substrate 110 is typically a transparent plastic film, such as a 7 mil (177 µm) poly(ethylene terephthalate) (PET) sheet. The lower surface (in FIG. 1) of substrate 110, which forms the viewing surface of the final display, may have one or more additional layers (not shown), for example a protective layer to absorb ultra-violet radiation, barrier layers to prevent ingress of oxygen or moisture into the final display, and anti-reflection coatings to improve the optical properties of the display. Coated on to the upper surface of substrate 110 is the thin light-transmissive electrically conductive layer 120, preferably of ITO, which acts as the common front electrode in the final display. PET films coated with ITO are available commercially.

The electro-optic layer 130 may be deposited on the conductive layer 120, typically by slot coating, the two layers being in electrical contact. The electro-optic layer 130 shown in FIG. 1 is an encapsulated electrophoretic medium and comprises microcapsules 140, each of which comprises negatively charged white particles 150 and positively charged black particles 160 in a hydrocarbon-based fluid 165. The microcapsules 140 are held retained within a polymeric binder 170. Upon application of an electrical field across electro-optic layer 130, white particles 150 move to the positive electrode and black particles 160 move to the negative electrode, so that electro-optic layer 130 appears, to an observer viewing the display through substrate 110, white or black depending on whether conductive layer 120 is positive or negative relative to the adjacent pixel electrode in the backplane. As would be understood by one of skill in the art, the charged particles (150, 160) are not limited to black and white and may be of any color.

The FPL 100 is desirably prepared by coating the lamination adhesive 180, in liquid form, conveniently by slot coating, on to release sheet 190, drying (or otherwise curing) the adhesive to form a solid layer and then laminating the adhesive and release sheet to the electro-optic layer 130, which has previously been coated on to the substrate 110 bearing the conductive layer 120; this lamination may conveniently be effected using hot roll lamination. (Alternatively, but less desirably, the lamination adhesive may be applied over the electro-optic layer 130 and there dried or otherwise cured before being covered with the release sheet 190.) The release sheet 190 is conveniently a 7 mil (177 µm) film; depending upon the nature of the electro-optic medium used, it may be desirable to coat this film with a release agent, for example a silicone. As illustrated in FIG. 1, the release sheet 190 is peeled or otherwise removed from the lamination adhesive 180 before the FPL 100 is laminated to a backplane (not shown) to form the final display.

The front plane laminate 100 is illustrated in FIG. 1 in a general form which may be used in all areas of the present invention. The adhesive layer 180 incorporated in the FPL 100 may comprise a composite material having low thermal sensitivity, as will be described in greater detail below.

Further details regarding front plane laminates and processes for the preparation and use thereof are described in the aforementioned U.S. Pat. No. 6,982,178, as well as U.S. Patent Application Publication No. 2009/0225397, the contents of which are incorporated herein by reference in their entireties.

Figure 2:
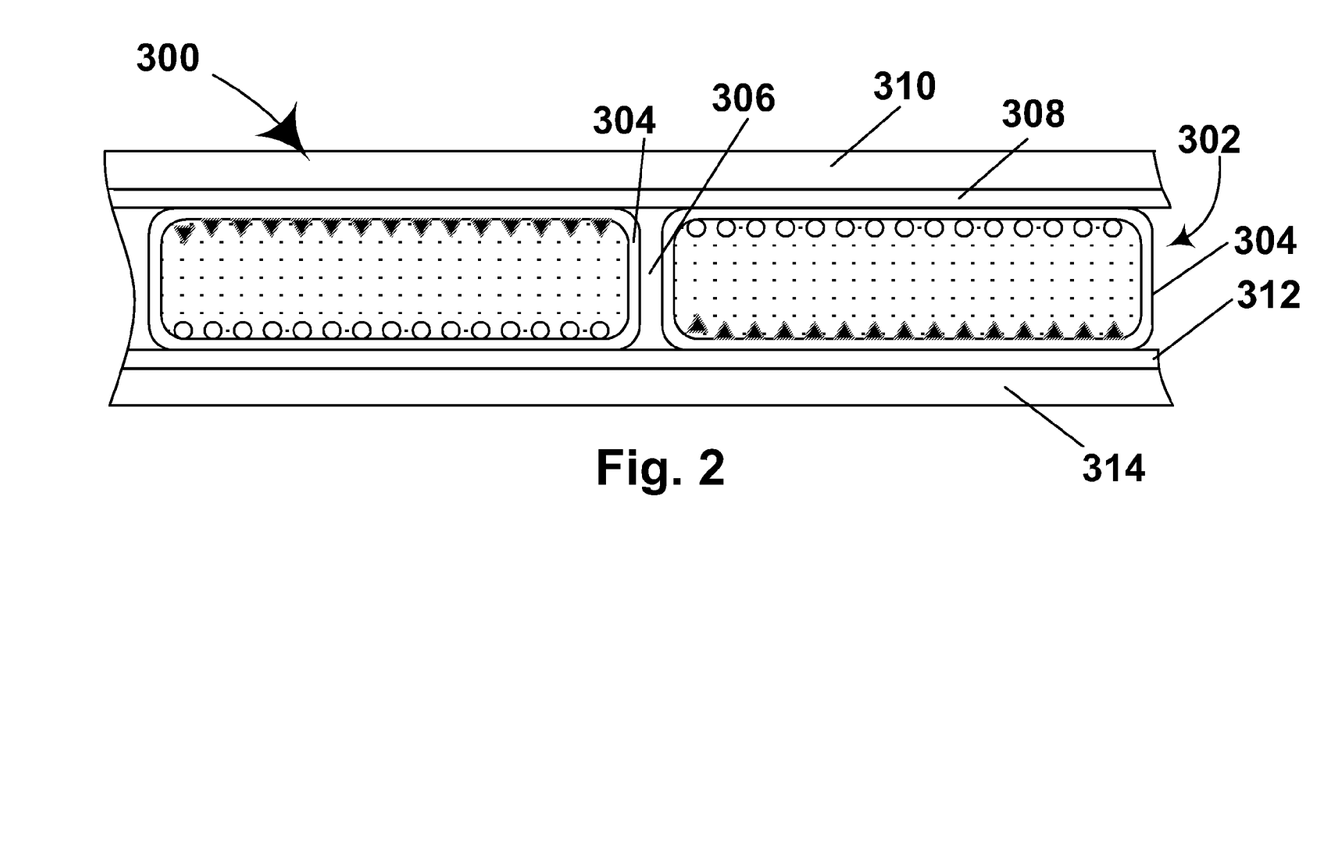
FIG. 2 is a schematic cross-section through a double release film of the present invention.

A double release sheet (generally designated 300) according to another embodiment of the present invention is shown in FIG. 2 of the accompanying drawings. The double release sheet 300 comprises a central layer 302 of electro-optic material, specifically in FIG. 2 a layer comprising capsules 304 in a polymeric binder 306. The capsules 304 may be similar to those described above with reference to FIG. 1. The sheet 300 further comprises a first adhesive layer 308, a first release sheet 310 covering the first adhesive layer 308, a second adhesive layer 312 disposed on the opposed side of the layer 302 from the first adhesive layer 308, and a second release sheet 314 covering the second adhesive layer 312.

The sheet 300 may be formed by first coating a the release sheet 310 with a layer of adhesive which is then dried or cured to form the first adhesive layer 308. Next, a mixture of the capsules 304 and binder 306 is printed or otherwise deposited on the first adhesive layer 308, and then the mixture is dried or cured to form a coherent layer 302. Finally, a layer of adhesive is deposited over the layer 302, dried or cured to form the second adhesive layer 312, and covered by the second release sheet 314.

It will be apparent to those skilled in coating technology that this sequence of operations used to form the sheet 300 is well adapted for continuous production and that, by careful choice of materials and process conditions, it may be possible to carry out the entire sequence of operations in a single pass through conventional roll-to-roll coating apparatus.

To assemble a display using a double release film such as the film 300, one release sheet (typically that on to which the electro-optic material was coated) is peeled away, and the remaining layers of the double release film are attached to a front substrate using, for example a thermal, radiation, or chemically based lamination process. Typically, the front substrate will include a conductive layer which will form the front electrode of the final display. The front substrate may include additional layers, such as an ultra-violet filter or a protective layer intended to protect the conductive layer from mechanical damage. Thereafter, the other release sheet is peeled away, thereby exposing the second adhesive layer, which is used to attach the electro-optic material coating assembly to a backplane. Again, a thermal, radiation, or chemically based lamination process may be used. It will be appreciated that the order of the two laminations described is essentially arbitrary and could be reversed, although it practice it is almost always more convenient to laminate the double release film to the front substrate first, and thereafter to laminate the resulting front subassembly to the backplane.

Further details regarding double release films and processes for the preparation and use thereof are disclosed in U.S. Patent Application Publication No. 2004/0155857, the contents of which are incorporated herein by reference in their entireties.

Either or both of the adhesive layers 308 and 312 may comprise a composite material containing a polymer phase and filler phase. The concentration of the filler phase is selected such that the composite system exhibits a lower temperature dependence of its conductivity over a temperature range that is relevant to display operation.

The filler phase added to the polymeric phase of the composite system preferably has a greater conductivity than the polymeric phase, so that adding more filler to the polymeric phase increases the conductivity of the composite. Furthermore, it is preferred that the filler has a thermal coefficient of expansion (CTE) that is substantially less than that of the polymer composite. For example, a composite material containing a polyurethane for the polymer phase and metal needles or flake, such as aluminum or nickel, may be provided. The CTE of polyurethanes may be in the range of 60 to 200 ppm/K. The CTE of aluminum is about 22 ppm/K. Nickel has a CTE of about 13 ppm/K. A ratio of the CTE of the filler phase to the CTE of the polymeric phase is preferably 0.5 or less, more preferably 0.3 or less, and most preferably 0.1 or less.

In order to suppress the temperature effects on the conductivity of the composite, filler is added to the composite in an amount about the percolation threshold. As used herein throughout the specification and the claims, "percolation threshold" means the filler volume fraction in a composite material containing a polymer phase and filler phase below which the composite material exhibits a conductivity whose logarithm is closer to the logarithm of the conductivity of the polymer phase than the filler phase and above which the composite material exhibits a conductivity whose logarithm is closer to the logarithm conductivity of the filler phase than the polymer phase.

Figure 5:
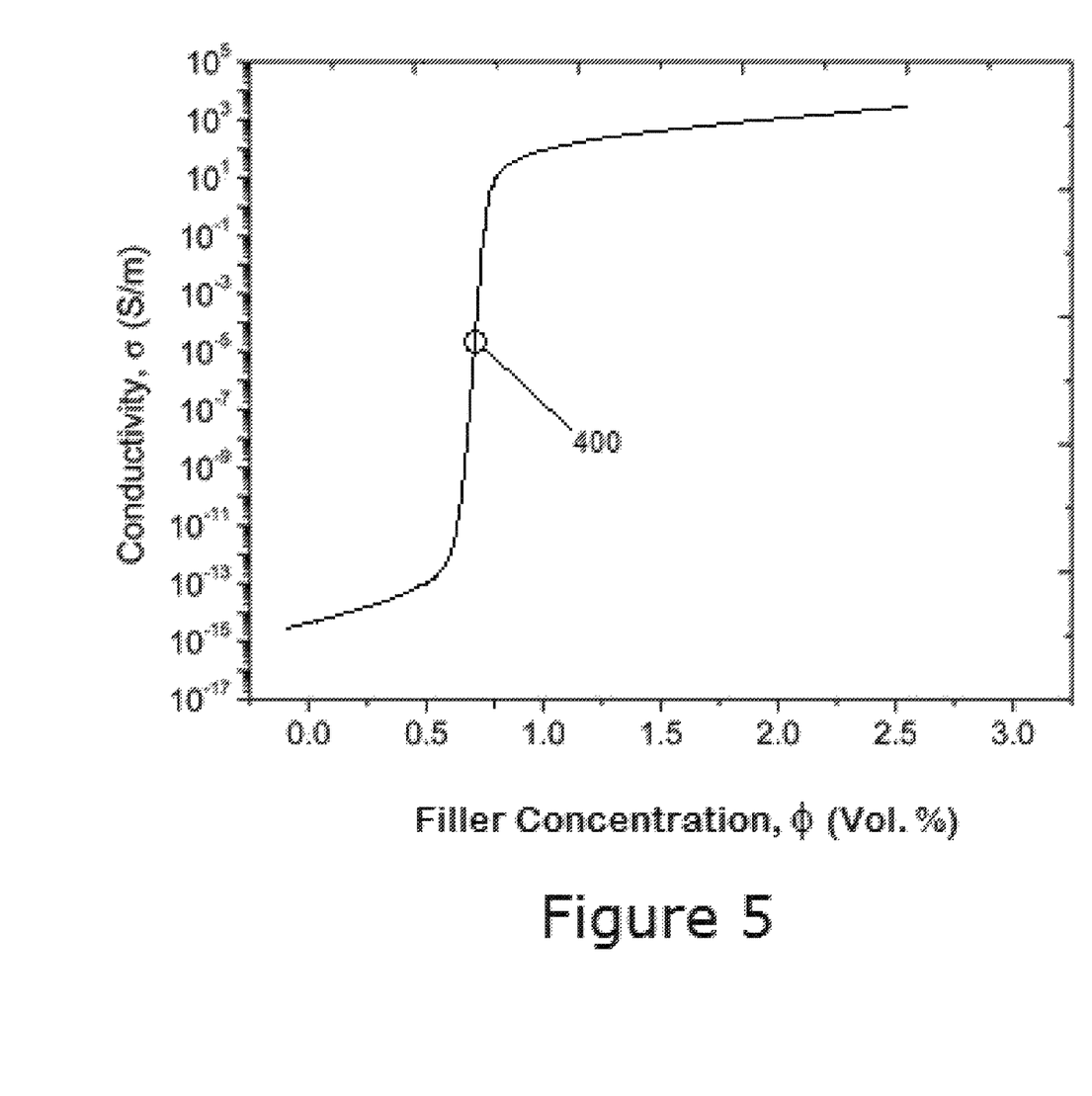
FIG. 5 is plot of volume fraction vs. conductivity for a polymeric composite.

By ensuring that the volume fraction of filler in the polymeric matrix is about the percolation threshold, the conductivity of the composite is restrained despite large temperature swings. Referring to FIG. 5, a representative plot is provided of the conductivity of a polymeric composite (y-axis) versus the volume fraction of filler in the polymeric composite (x-axis). The point 400 on the plot is the percolation threshold.

If the coefficient of thermal expansion of the polymeric phase in the composite is much greater than the coefficient of thermal expansion of the filler, the volume fraction of the filler phase in the composite material will decrease with increasing temperature. For example, if the starting volume fraction $\phi$ of filler in the composite is about the percolation threshold (400), the conductivity of the composite will substantially decrease with increasing temperature because the filler concentration will decrease. This can combat the natural tendency for increased conduction at elevated temperature of the unfilled polymer matrix. As the temperature cools, the polymeric phase will contract more than the filler causing the volume fraction of the filler to increase. Thus, if the starting volume fraction of the filler in the composite is about the percolation threshold (400), the conductivity of the composite will increase with decreasing temperature.

Thus, by incorporating a filler having a substantially smaller coefficient of thermal expansion than a polymeric phase in a composite material and loading the composite with a filler about the percolation threshold, one may reduce the fractional change in conductivity with temperature effects that would have been expressed by the unfilled polymeric material. In other words, the tendency toward increased electrical conductivity with increased temperature and decreased conductivity with decreased temperature is reduced. The composite material according to the various embodiments of the present invention may provide materials having much less variation in the fractional change of the electrical conductivity over a temperature range of interest than one may find from using an unfilled polymer.

Figure 6:
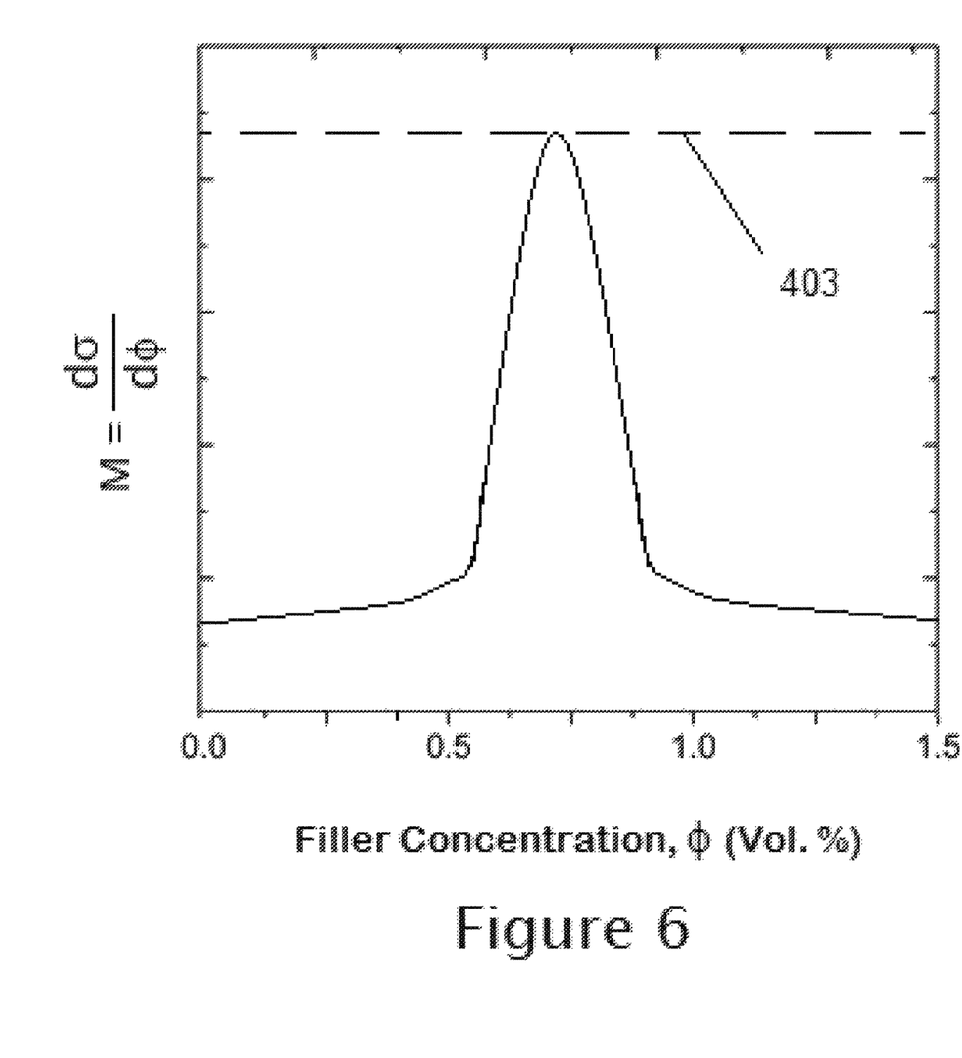
FIG. 6 is the plot of FIG. 5 with line y1 and line y2.

As used herein throughout the specification and the claims, the phrase "about the percolation threshold" means a filler concentration (volume percent) at or above the conductivity transition point. The conductivity transition point may be calculated from the conductivity curve of the composite material, such as the plot provided in FIGS. 5 and 6. Referring to FIG. 6, a first line y1 is drawn through the point on the conductivity curve for the composite material at a filler concentration of zero, the line y1 having a slope m1 equal to the slope of the conductivity curve at a filler concentration of zero. A second line y2 is drawn through the point on the conductivity curve corresponding to the percolation threshold, the line y2 having a slope m2 equal to the slope of the conductivity curve at the percolation threshold. The intersection 402 on FIG. 6 of the two lines, y1 and y2, provides the conductivity transition point. The filler concentration at the conductivity transition point may be calculated, for example, using equations (1) and (2) below for y1 and y2:

$$y1 = m1*(\phi) + b1 \qquad \text{Eq. 1}$$

$$y2 = m2*(\phi) + b2 \qquad \text{Eq. 2}$$

At the conductivity transition point, y1 equals y2, therefore:

$$m1*(\phi)+b1=m2*(\phi)+b2$$

Solving for "$\phi$" provides equation (3):

$$\phi=(b2-b1)/(m1-m2) \qquad \text{Eq. 3.}$$

Thus, the filler concentration at the conductivity transition point is equal to the ratio of the difference between the y-intercept of y2 and y1 to the difference between the slope of y1 and y2.

It is preferred that the composite material used in the various embodiments of the present invention exhibits a change in conductivity with temperature, i.e. $(1/s)*ds/dT$, that is less than or equal to 60% of the change in conductivity with temperature of the unfilled polymer, more preferably less than or equal to 30%, most preferably less than or equal to 10%.

When incorporating the composite in the adhesive layer of an electro-optic display, the polymeric phase of the composite material according to the various embodiments of the present invention is preferably an anisotropic lamination adhesive having a conductivity which is greater in the direction from the electrode to the electro-optic material than in the plane of this layer. Such an anisotropic adhesive produces only a small voltage drop between the electrode and the electro-optic material (thus allowing as large an electric field as possible across the layer of electro-optic material) while presenting high resistance to current flow between adjacent electrodes, and thus minimizing cross-talk between adjacent pixels of a display.

The lamination adhesive may be a hot melt adhesive, but can also be a thermosetting, radiation curable, or pressure sensitive adhesive. The adhesive may be based upon ethylene vinyl acetate, acrylic, polyolefin, polyamide, polyester, polyurethane, silicone, epoxy, polyvinyl butyrate, polystyrene-butadiene or vinyl monomers or oligomers. To provide the necessary anisotropic conductivity, the adhesive may be loaded with conductive particles, for example carbon particles, silver particles, plated polymer spheres, plated glass spheres, indium tin oxide particles, or nano-phase indium tin oxide particles. Alternatively, conductive polymers such as polyacetylene, polyaniline, polypyrrole, poly(3,4-ethylenedioxythiophene) (PEDOT), or polythiophene can be used to dope the polymer and cause it to conduct well in the z-axis direction (perpendicular to the thickness of the layer of adhesive) but not in the plane of this layer. In order to make these films, the adhesive sheet can be cast and then stretched in one or both axes to introduce the necessary anisotropic conductivity. Various types of anisotropic adhesives are described in U.S. Pat. Nos. 6,365,949; 5,213,715; and 4,613,351, and anisotropic adhesives are available commercially, for example from Minnesota Mining and Manufacturing Corporation ("3M"), Henkel Loctite Corporation, 1001 Trout Brook Crossing, Rocky Hill Conn. 06067, Btech Corporation, 8395 Greenwood Drive, Longmont CO 80503, and Dana Enterprises International, 43006 Osgood Road, Fremont Calif. 94539.

It is generally preferred that the anisotropic adhesive used in the various embodiments of the present invention have a conductivity of less than about $10^{-10}$ S/cm. in the plane of the adhesive layer and a conductivity greater than about $10^{-9}$ S/cm. in the z-axis direction.

A process for forming a composite material according to one embodiment of the present invention is also provided. The composite material may be provided in the form of a layer of an anisotropic adhesive having greater conductivity perpendicular to the plane of the layer than in a parallel direction. The process comprises dispersing a plurality of conductive filler particles in an adhesive matrix, the particles having a conductivity differing from that of the matrix; applying to the particles/matrix mixture an electric or magnetic field effective to cause the particles to form conductive strands extending substantially perpendicular to the plane of the layer; and increasing the viscosity of the matrix (typically by gelling or curing the matrix) to prevent the particles moving out of the strands.

Figure 3A:
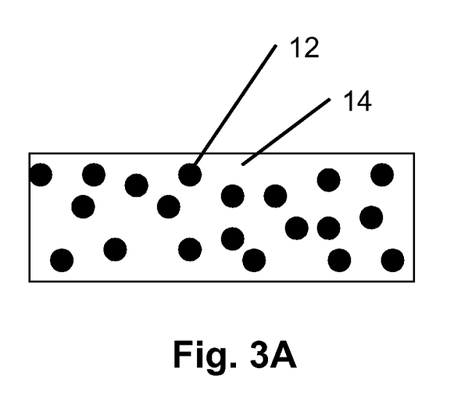
FIGS. 3A and 3B are schematic cross-sections through an adhesive layer at two successive stages of the process of the present invention.
Figure 3B:
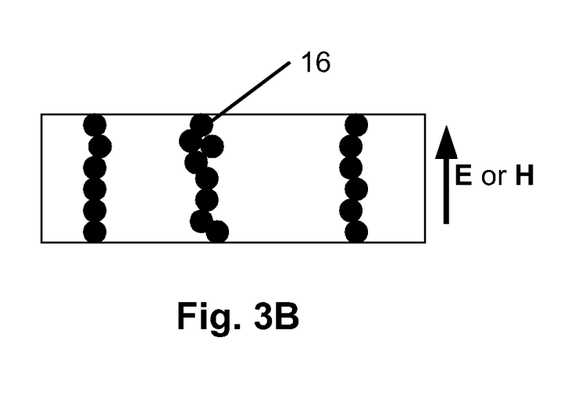

The use of electrorheological and magnetorheological effects to produce anisotropically conductive films by the process of the present invention is illustrated in a highly schematic manner in FIGS. 3A and 3B of the accompanying drawings. The electrorheological (ER) effect is an effect by which application of an electrical field across a particulate dispersion, e.g., a dispersion contained between parallel plate electrodes, causes the particles composing the dispersion to form into strands or acicular agglomerates. As shown in FIG. 3A, the process begins by forming a layer of conductive particles 12 dispersed in a matrix (continuous phase) of a lamination adhesive 14. An electric or magnetic field is applied perpendicular to the plane of the layer, thereby causing the particles 12 to form strands 16 extending through the thickness of the layer, as illustrated in FIG. 3B. Finally, the viscosity of the matrix 14 is greatly increased, typically by gelling or curing the matrix, to prevent further movement of the particles 12 through the matrix 14, and thus lock the strands 16 in place.

Formation of strands parallel to the electric field lines occurs when the complex conductivity (k*) of the particles is significantly higher than that of the matrix. In a preferred process of the present invention, the precursor adhesive (as shown in FIG. 3A) consists of relatively high conductivity particles, $k_p > 10^{-9}$ S/cm, dispersed in a low conductivity matrix, $k_m < 10^{-11}$ S/cm. The particles are aligned in the z-axis direction by application of an electric field across the dispersion, and the resultant z-axis strands are locked in place by curing or gelling the matrix. The final adhesive film then contains conductive strands spanning or percolating only in the z-axis direction because strands are spaced laterally and therefore separated by the low conductivity matrix. Z-axis conduction will be dominated by the conductivity of the strands and therefore by the particle conductivity, while lateral conductivity will be dominated by that of the continuous low conductivity matrix.

This method is particularly well-suited for preparing continuous thin films of a z-axis lamination adhesive. For example, continuous thin film z-axis conductive adhesives can be prepared by feeding a well-mixed dispersion of conductive particles in a low conductivity adhesive matrix into a coating die, and coating the dispersion into a thin film, typically 10-100 μm thick, followed by application of the electric field and curing or gelling.

A magnetorheological process for producing a z-axis conductive adhesive is similar to the electrorheological process; magnetic particles are dispersed in a non-magnetic adhesive matrix, the particles are aligned into strands in the z-axis direction by application of a magnetic field, and the strands are locked in by curing or gelling of the matrix. In this case, the particles need to be both magnetically polarizable and to have a conductivity in the range described above, typically greater than $10^{-9}$ S/cm. The range of particles meeting these requirements for the magnetorheological process is perhaps more limited than the range of particles suitable for the electrorheological process, but a magnetorheological process is preferred because application of the magnetic field across the layer does not require making electrical contact with the surface of the layer, and thus an aqueous based adhesive matrix can be used, which is typically not the case with the electrorheological process.

In an electrorheological process to produce a composite material containing lamination adhesive compositions as the polymeric matrix, the conductive particles used as the filler may preferably have a conductivity, with increasing preference in the order given, not less than $0.5 \times 10^{-9}$ S/cm, $0.5 \times 10^{-7}$ S/m, $0.5 \times 10^{-5}$ S/m, $0.5 \times 10^{-3}$ S/m, $0.5 \times 10^{-1}$ S/m, 5 S/m, $0.5 \times 10^{3}$ S/m, $0.5 \times 10^{5}$ S/m, $0.5 \times 10^{6}$ S/m, $10 \times 10^{6}$ S/m, and $20 \times 10^{6}$ S/m and a diameter not greater than about $\frac{1}{10}$ of the thickness of the final film. (The term "diameter" is used herein to include what is usually known as the "equivalent diameter" of a non-spherical particle, namely the diameter of a spherical particle having the same volume as the non-spherical one.) The particles can be formed from semiconducting polymers, for example acidically doped polyanilines, polythiophenes, and pyrolyzed polyacrylonitriles. The particles may alternatively be formed from low k* materials that are "activated" (raised) to higher k* (relative to that of the matrix) by addition of trace amount of a polar material, for example water or ethylene glycol, that adsorbs primarily on the surface of the particles. Suitable low k* materials include cellulosic materials, and various aluminas, silicates, and zeolites. The matrix (continuous phase) should have a low conductivity relative to that of the particles, this low conductivity preferably being less than $10^{-10}$ S/cm. Many low-conductivity, low-viscosity oils, such as the hydrocarbons used as the fluids in many encapsulated electrophoretic media may be suitable; however the matrix must also behave as an adhesive, and be gellable or curable to lock in the z-axis strands formed in the process. For example thermally reversible gelling materials such as Kraton (Registered Trade Mark) rubbers (block copolymers) or polyurethanes may be particularly advantageous as a continuous phase, alone or in combination with a diluent to lower viscosity for coating and particle alignment. Typical non-aqueous pressure sensitive adhesives like polyacrylate solutions, or succinate-functionalized hydrocarbon polymers, for example ethylene propylene copolymers, or silicone rubber type adhesives, may also be used. For gelling type matrices, coating and particle alignment occurs under conditions where the material is not gelled, and then after formation of the strands, the matrix is gelled, for example by lowering the temperature or cross-linking the matrix by addition or removal of a chemical component or reactant or exposure to an ultra-violet light source. For solvent based non-aqueous adhesives, the strands can be locked in position by rapidly evaporating the solvent.

The magnetorheological process of the present invention may use any of the types of matrices discussed above, since the magnetorheological process differs from the electrorheological process only in the formation of the strands by magnetic field alignment instead of electric field alignment. However, since the magnetorheological process can make use of aqueous matrices as well as non-aqueous ones, polyurethane adhesives, gelatin, or other aqueous continuous phases may also be used. Particles suitable for use in the magnetorheological process include iron and other magnetizable materials, such as nickel and carbonyl iron; these materials are generally supplied in particle sizes greater than 1-10 µm, which may not be optimal for preparing thin films of adhesive, but they may be milled to smaller sizes for use in the present process. Iron oxides, such as $\gamma$-$Fe_2O_3$ materials used in the magnetic recording industry, are typically supplied in much smaller particle sizes, around 10-100 nm, and may therefore be used as supplied in the preparation of thin films.

The criteria for particles to be used in the magnetorheological process of the present invention differ somewhat from most other applications of magnetorheological particles. The present process does not require strong saturation magnetization, a typical criterion for choosing particles for a magnetorheological fluid, but in the present process the particles should be conductive enough to satisfy the z-axis conductivity range outlined above.

The lamination adhesive film containing the composite material described above can then be laminated to the electro-optic material and ultimately to an active matrix backplane, under conditions where the anisotropic conductivity of the adhesive is maintained because the film never undergoes large scale flow (with respect to strand length) during the lamination processes.

Any anisotropic z-axis conductive adhesive based upon conductive strands or similar conductive regions within an essentially non-conductive matrix should have sufficient strands or conductive regions per unit area for each pixel of the electro-optic material with which the adhesive is used to experience a substantially uniform or homogeneous electric field over its entire area, or undesirable optical effects may occur. The strand density per unit area may be adjusted, for example, by altering conductive particle size, volume fraction of conductive particles, and the intensity and duration of the aligning field, thereby allowing the fine structure of the anisotropic adhesive to be varied.

Figure 4:
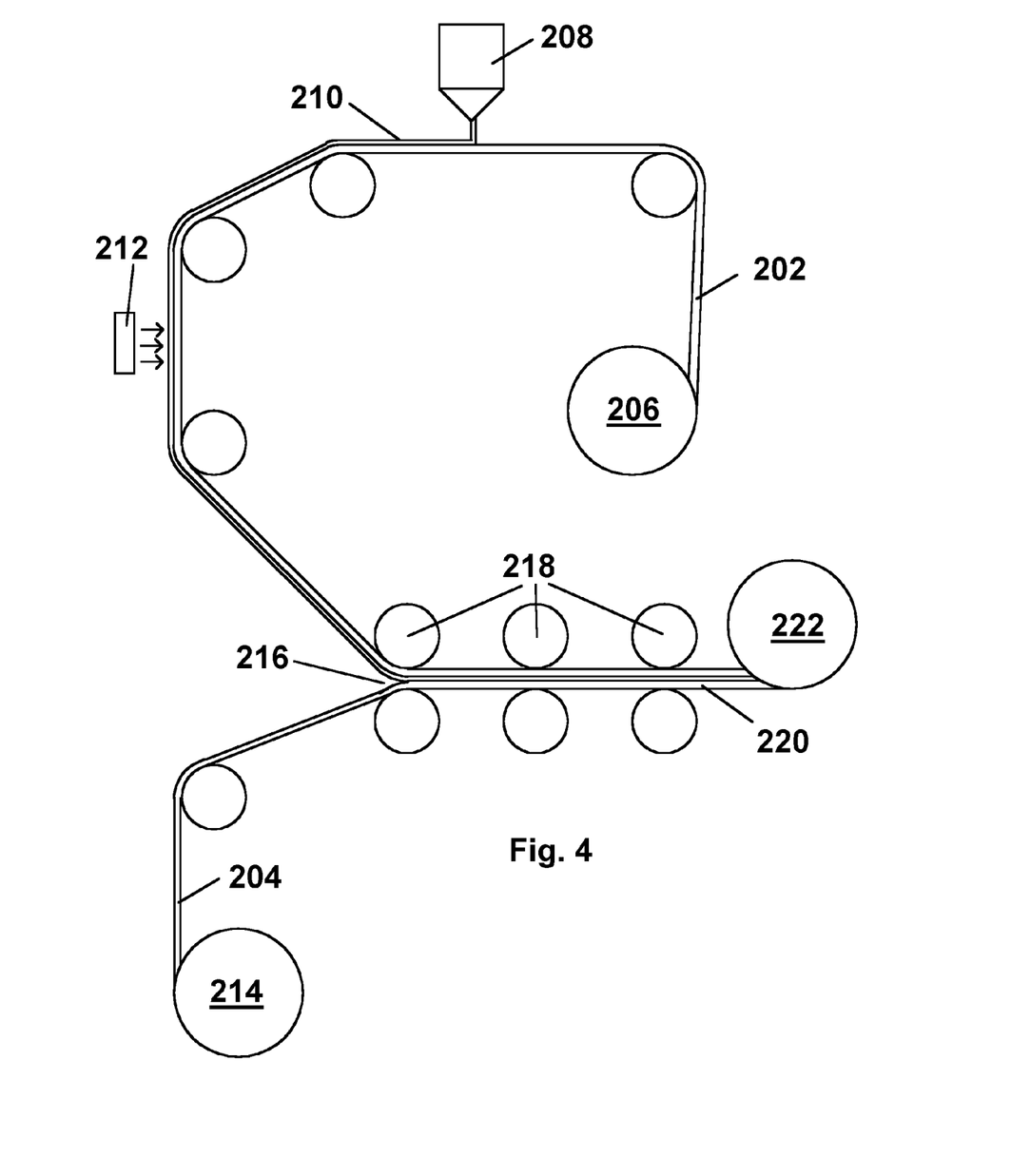
FIG. 4 is a schematic side elevation of apparatus which may be used to carry out a process of the present invention.

Several types of lamination processes may be in the fabrication of electrophoretic devices, including batch unit operations. A preferred process of this type is illustrated in a highly schematic manner and in side elevation in FIG. 4 of the accompanying drawings. As shown in this Figure, the process forms a display by the convergence of two webs 202 and 204. The web 202, comprises a rear electrode assembly on a flexible substrate, although the individual components are not shown in FIG. 4. Similarly, the web 204 comprises a flexible substrate, a transparent electrode layer, for example an ITO layer, and a dried film of capsules and binder, although again the individual components are not shown in FIG. 4. As shown in FIG. 4, the web 202 is unwound from a feed spool 206 and brought, electrode side up, beneath a die 208 for coating with a thin layer of a radiation curable lamination adhesive 210. The adhesive 210 may for example be curable by visible, ultra-violet or electron beam radiation. The web 202 bearing adhesive 210 passes a radiation source 212, the intensity of which is adjusted having regard to both the catalyst concentration (and hence curing speed) of the adhesive 210 and the speed of the web 202. (If an anisotropic adhesive is being used, an electrical or magnetic head may be provided between the die 208 and the radiation source 212 to form the desired strands of conductive particles before the matrix is cured or gelled by the radiation source 212.)

The web 204 is unwound from a feed spool 214 and carries the dried capsule-containing layer to a convergence point 216, at which the webs 202 and 204 are brought together. At this convergence point 216, the radiation curable resin 210 is still in liquid form, and easily fills voids on the surface of the capsule-containing layer. The coordination of web speed, catalyst concentration and radiation intensity is adjusted to provide a cure rate such that hardening occurs after the convergence point 216, while the two webs 202 and 204 are being held together with rollers 218. Finally, the laminated web 220 produced is wound on a take-up spool 222a.

It will be seen that the foregoing process allows the lamination process to operate in-line, and thus enables higher production rates than the batch unit processes previously discussed.

In another embodiment of the present invention, the composite materials may be incorporated in the electro-optic material layers of the display. Specifically, the composite material may be incorporated in either the binder of encapsulated media or the polymeric film used to form microcells. Some binder or polymeric film materials exhibit changes in volume resistivity of more than two orders of magnitude when the temperature and humidity of their environment is varied within the ranges of 10-50° C. and 10-90 percent relative humidity (RH). For satisfactory performance, it has been found that the volume resistivity of the binder/film material should not vary by a factor of more than about 10 within the ranges of 10 to 90 percent RH and 10 to 50° C., or within any broader RH and temperature ranges within which the display is intended to operate. Desirably, the volume resistivity does not change by a factor of more than about 3, and preferably not more than about 2 within the specified RH and temperature ranges.

In order to limit the thermal sensitivity of the binder/film material to temperature and RH, a filler may be incorporated in the binder/film material to provide a composite similar to the above described composite materials. Incorporating a conductive filler about the percolation threshold in a polymeric matrix having a greater coefficient of thermal expansion than the filler will similarly limit the temperature effects on the resistivity of the binder/film. For example, with increasing temperature the polymeric phase will expand at a greater rate than the filler phase. If the volume fraction of the filler phase is about the percolation threshold, the resistivity of the composite material will decrease with increasing temperature. When the temperature decreases, the polymeric phase will contract at a higher rate causing an increase in the volume fraction of filler and in turn a decrease in the resistivity of the composite. Thus, a composite material according to the various embodiments of the present invention may provide a binder/film having reduced thermal sensitivity as compared to a binder/film lacking any filler.

Examples of acceptable binder materials include, but are not limited to, aliphatic polyurethanes free from aromatic materials, such as NeoResin R 9630, NeoResin R 9330, NeoResin R 9314, NeoResin R 9314, NeoResin 9621, and mixtures thereof. It is preferred that the binder should have a volume resistivity, measured at 10° C., which does not change by a factor of more than about 3 after being held at 25° C. and 45 percent relative humidity for 1000 hours. The phrase "being held" is deliberately used to stress that, in testing binders to determine whether they conform to the requirements of this aspect of the present invention, care should be taken to ensure that the binder material does equilibrate with the specified atmosphere within a reasonable time. If a binder material is tested in thick layers, it may not equilibrate with the specified atmosphere for a considerable period and misleading results may be obtained. Such misleading results can be avoided by testing successively thinner layers of the binder material and checking that the results are consistent. For sufficiently thin layers, merely storing the binder material under the specified conditions for the specified period will suffice.

When testing materials for changes in volume resistivity with RH and temperature, the same precautions as discussed above should be observed to ensure that the samples tested are truly in equilibrium with the atmosphere at the desired RH and temperature before the volume resistivities are measured.

The polymeric material that may be used to form microcells include thermoplastics, thermosets, or precursors thereof. Examples of thermoplastic or thermoset precursors may include, but are not limited to multifunctional acrylate or methacrylate, multifunctional vinylether, multifunctional epoxide and oligomers or polymers thereof. A crosslinkable oligomer imparting flexibility, such as urethane acrylate or polyester acrylate, may also be added to improve the flexure resistance of the embossed microcells.

Further embossable compositions for microcells may comprise a polar oligomeric or polymeric material. Such a polar oligomeric or polymeric material may be selected from the group consisting of oligomers or polymers having at least one of the groups, such as nitro ($-NO_2$), hydroxyl ($-OH$), carboxyl ($-COO$), alkoxy ($-OR$ wherein R is an alkyl group), halo (e.g., fluoro, chloro, bromo or iodo), cyano ($-CN$), sulfonate ($-SO_3$) and the like. The glass transition temperature of the polar polymer material is preferably below about 100° C. and more preferably below about 60° C. Specific examples of suitable polar oligomeric or polymeric materials may include, but are not limited to, polyhydroxy functionalized polyester acrylates (such as BDE 1025, Bomar Specialties Co, Winsted, Conn.) or alkoxylated acrylates, such as ethoxylated nonyl phenol acrylate (e.g., SR504, Sartomer Company), ethoxylated trimethylolpropane triacrylate (e.g., SR9035, Sartomer Company) or ethoxylated pentaerythritol tetraacrylate (e.g., SR494, from Sartomer Company).

Another type of embossable composition for forming microcell comprises (a) at least one difunctional UV curable component, (b) at least one photoinitiator, and (c) at least one mold release agent. Suitable difunctional components may have a molecular weight higher than about 200. Difunctional acrylates are preferred and difunctional acrylates having a urethane or ethoxylated backbone are particularly preferred. More specifically, suitable difunctional components may include, but are not limited to, diethylene glycol diacrylate (e.g., SR230 from Sartomer), triethylene glycol diacrylate (e.g., SR272 from Sartomer), tetraethylene glycol diacrylate (e.g., SR268 from Sartomer), polyethylene glycol diacrylate (e.g., SR295, SR344 or SR610 from Sartomer), polyethylene glycol dimethacrylate (e.g., SR603, SR644, SR252 or SR740 from Sartomer), ethoxylated bisphenol A diacrylate (e.g., CD9038, SR349, SR601 or SR602 from Sartomer), ethoxylated bisphenol A dimethacrylate (e.g., CD540, CD542, SR101, SR150, SR348, SR480 or SR541 from Sartomer), and urethane diacrylate (e.g., CN959, CN961, CN964, CN965, CN980 or CN981 from Sartomer; Ebecryl 230, Ebecryl 270, Ebecryl 8402, Ebecryl 8804, Ebecryl 8807 or Ebecryl 8808 from Cytec). Suitable photoinitiators may include, but are not limited to, bis-acylphosphine oxide, 2-benzyl-2-(dimethylamino)-1-[4-(4-morpholinyl)phenyl]-1-butanone, 2,4,6-trimethylbenzoyl diphenyl phosphine oxide, 2-isopropyl-9H-thioxanthen-9-one, 4-benzoyl-4'-methyldiphenylsulphide and 1-hydroxycyclohexyl-phenyl-ketone, 2-hydroxy-2-methyl-1-phenyl-propan-1-one, 1-[4-(2-hydroxyethoxy)-phenyl]-2-hydroxy-2-methyl-1-propane-1-one, 2,2-dimethoxy-1,2-diphenylethan-1-one or 2-methyl-1 [4-(methylthio)phenyl]-2-morpholinopropan-1-one. Suitable mold release agents may include, but are not limited to, organomodified silicone copolymers such as silicone acrylates (e.g., Ebercryl 1360 or Ebercryl 350 from Cytec), silicone polyethers (e.g., Silwet 7200, Silwet 7210, Silwet 7220, Silwet 7230, Silwet 7500, Silwet 7600 or Silwet 7607 from Momentive). The composition may further optionally comprise one or more of the following components, a co-initiator, monofunctional UV curable component, multifunctional UV curable component or stabilizer.

The materials used as the filler phase in the binder materials may be the same as those previously listed for the composites incorporated in the lamination adhesive compositions described above.

The electro-optic medium present in the displays made according to the various embodiments of the present invention may be of any of the types previously discussed. Thus, the electro-optic medium within the binder may comprise, for example, droplets of a dispersion of colored, charged particles that are optionally encapsulated in microcapsules or microcells, droplets containing a rotating multichromal or bichromal particles encapsulated within a dispersion fluid, or an electrochromic medium. However, it is generally preferred that the electro-optic medium be an electrophoretic medium comprising a plurality of capsules, each capsule comprising a capsule wall and an internal phase comprising electrically charged particles in a fluid and capable of moving through the fluid on application of an electric field to the electrophoretic medium, the electrophoretic medium further comprising a polymeric binder within which the capsules are held.

Apart from the inclusion of the composite materials of the present invention, the electrophoretic media and displays of the present invention may employ the same components and manufacturing techniques as in the aforementioned E Ink and MIT patents and applications. The reader is referred to these patent and applications, and especially to the aforementioned U.S. Pat. No. 6,831,769, for details of preferred materials and processes for the production of encapsulated electrophoretic displays.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

The invention claimed is:

1. An electro-optic display comprising:
a layer of electro-optic material,
at least one conductor, and
an adhesive material between the layer of electro-optic material and the at least one conductor,
wherein at least one of the electro-optic material and adhesive material comprises a composite material comprising a polymer phase and a filler phase, the filler phase has a conductivity greater than or equal to $0.5 \times 10^3$ S/m, a ratio of the coefficient of thermal expansion of the filler to the polymer is less than or equal to 0.5, and
a concentration of the filler phase in the composite material is greater than or equal to a filler concentration corresponding to a conductivity transition point of the composite material.

2. The electro-optic display of claim 1, wherein the composite material exhibits a fractional change in conductivity with temperature less than or equal to 60% of the change in conductivity with temperature of the polymer phase alone.

3. The electro-optic display of claim 1, wherein the filler phase has a conductivity greater than or equal to $10 \times 10^6$ S/m.

4. The electro-optic display of claim 1, wherein the filler phase has a conductivity greater than or equal to $20 \times 10^6$ S/m.

5. The electro-optic display of claim 1, wherein a ratio of the coefficient of thermal expansion of the filler to the polymer is less than or equal to 0.3.

6. The electro-optic display of claim 1, wherein a ratio of the coefficient of thermal expansion of the filler to the polymer is less than or equal to 0.1.

7. The electro-optic display of claim 1, wherein the electro-optic material comprises a binder containing droplets of a dispersion.

8. The electro-optic display of claim 7, wherein the droplets are encapsulated within microcapsules.

9. The electro-optic display of claim 7, wherein the binder comprises the polymer phase and the filler phase.

10. The electro-optic display of claim 7, wherein the dispersion comprises charged particles dispersed in a solvent.

11. The electro-optic display of claim 10, wherein the charged particles include a plurality of colored particles.

12. The electro-optic display of claim 1, wherein the electro-optic material comprises a binder containing a plurality of multi-chromal particles encapsulated within a dispersion fluid.

13. The electro-optic display of claim 12, wherein the binder comprises the polymer phase and the filler phase.

14. The electro-optic display of claim 12, wherein the multi-chromal particles are bi-chromal.

15. The electro-optic display of claim 1, wherein the electro-optic material comprises a polymeric film having a plurality of microcells.

16. The electro-optic display of claim 15, wherein the polymeric film comprises the polymer phase and the filler phase.

17. The electro-optic display of claim 15, wherein the microcells contain a dispersion of charged particles dispersed in a solvent.

18. The electro-optic display of claim 17, wherein the charged particles include a plurality of colored particles.

* * * * *